United States Patent [19]
Fell et al.

[11] 3,866,399
[45] Feb. 18, 1975

[54] SEVERED CROP HANDLING MECHANISM FOR HARVESTERS

[75] Inventors: Ferol S. Fell, Newton; William D. Long, Hesston; Kenneth R. McMillen, Moundridge, all of Kans.

[73] Assignee: Hesston Corporation, Hesston, Kans.

[22] Filed: Apr. 23, 1973

[21] Appl. No.: 353,350

Related U.S. Application Data

[63] Continuation of Ser. No. 114,308, Feb. 10, 1971, abandoned, which is a continuation-in-part of Ser. No. 86,767, Nov. 4, 1970, Pat. No. 3,736,733.

[52] U.S. Cl. ............................................... 56/98
[51] Int. Cl. ............................................ A01d 45/02
[58] Field of Search ........ 56/119, 98, 108, 104, 106

[56] References Cited
UNITED STATES PATENTS
2,480,209   8/1949   Aasland ............................... 56/108
3,375,646   4/1968   Dion ..................................... 56/98
3,585,789   6/1971   Blanshine et al. ..................... 56/98

*Primary Examiner*—Russell R. Kinsey

[57] ABSTRACT

A row crop harvester, utilizing rolls for feeding severed stalks to a rotary chopper, is provided with one or more pairs of endless, stalk-gathering chains, declined forwardly from the rolls, and having plate-like, stalk-gripping lugs, the edges of which crease the stalks as they are clamped and elevated by the lugs to prevent axial displacement of the stalks. Open top troughs for the elevators, having laterally flared outlets, are provided with inclined slide panels for the severed butts which include terminal portions at the outlets that are specially formed and oriented to not only assure proper, anti-clogging direction of the stalks to the feed rolls, but effectively strip the stalks from the lugs at the point of release to the rolls.

4 Claims, 7 Drawing Figures

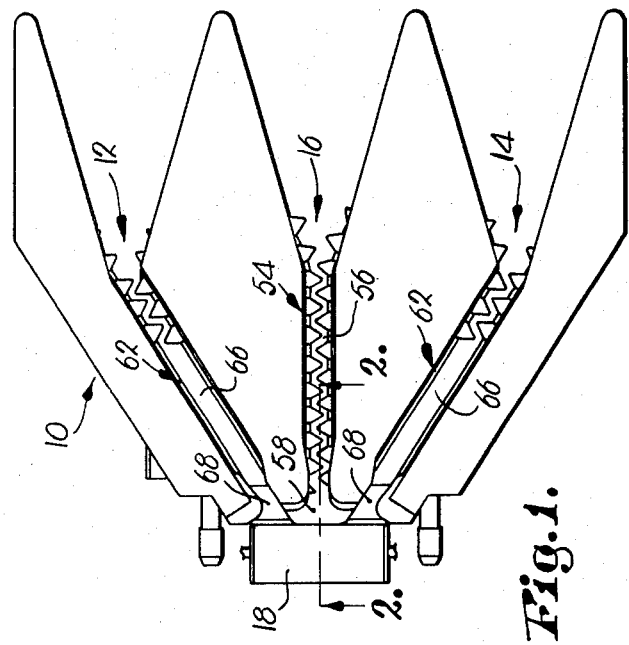
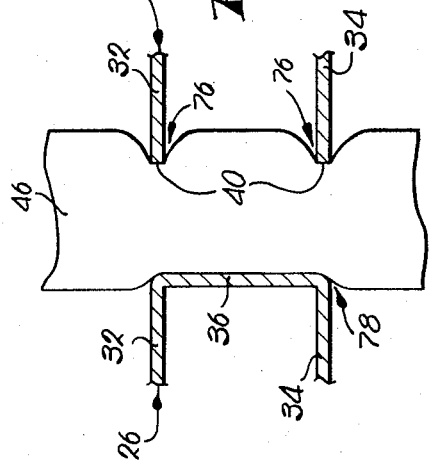
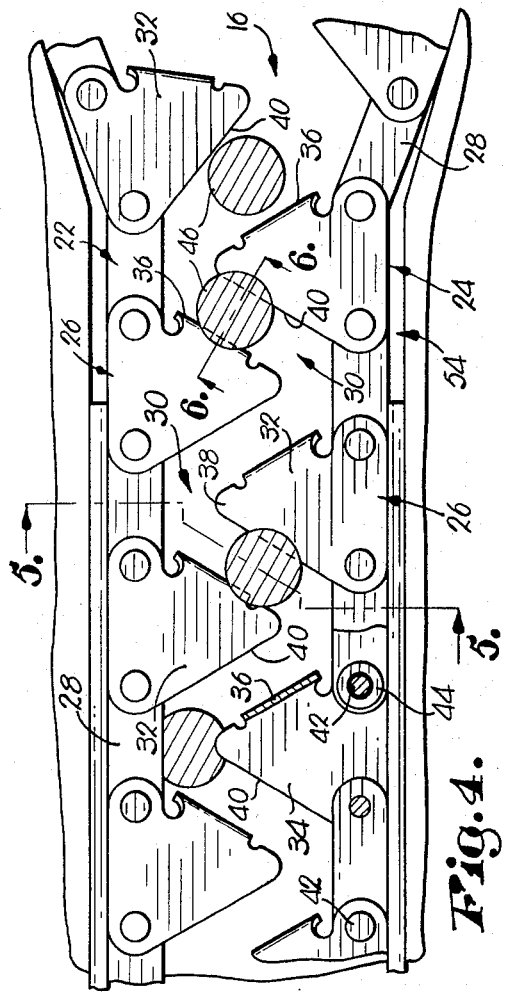
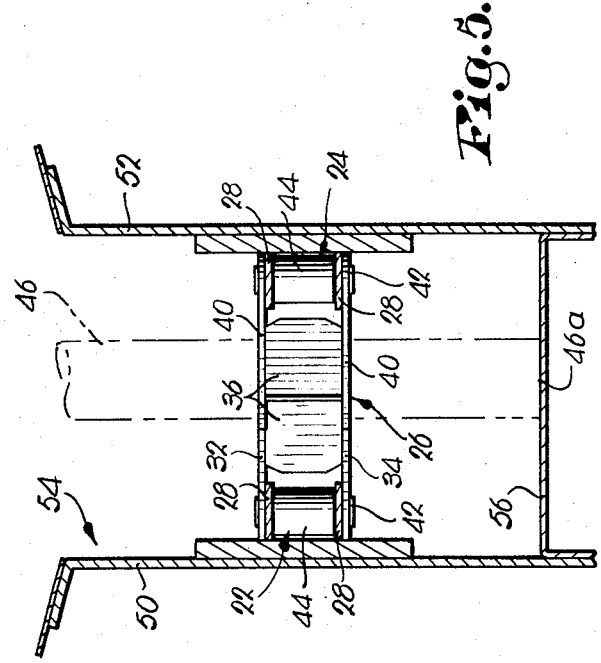

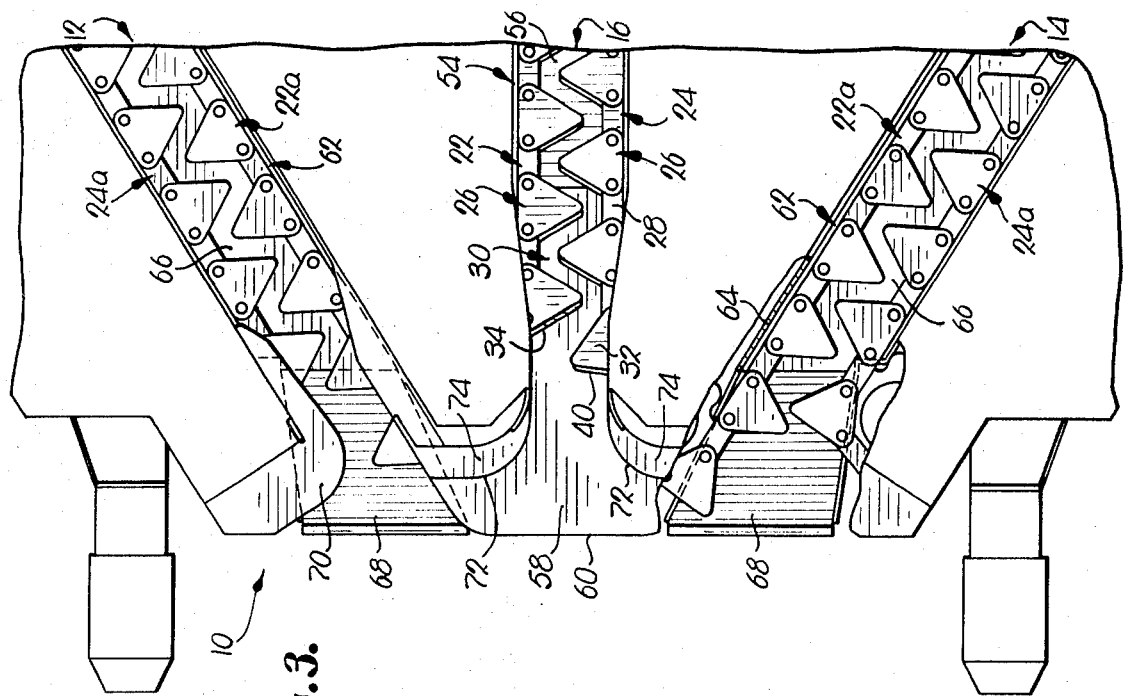
Fig.3.
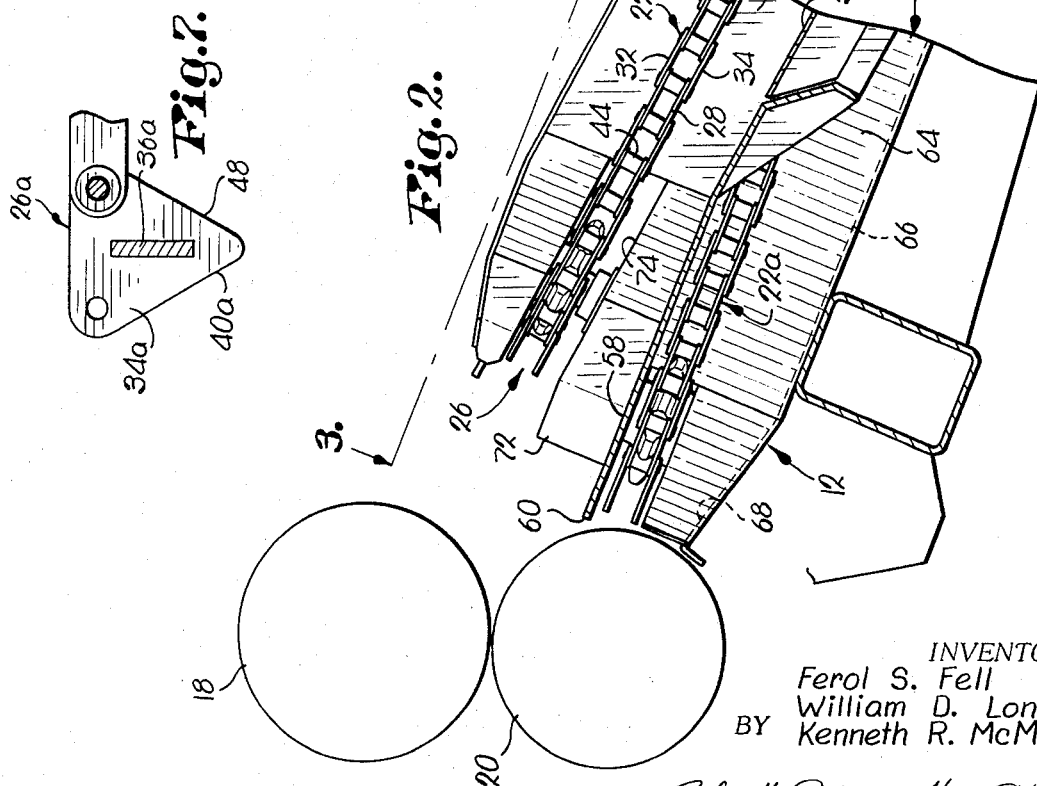
Fig.7.
Fig.2.
INVENTORS.
Ferol S. Fell
William D. Long
BY Kenneth R. McMillen
Schmidt, Johnson, Hovey & Williams
ATTORNEYS.

SEVERED CROP HANDLING MECHANISM FOR HARVESTERS

This is a continuation of Application Ser. No. 114,308, filed Feb. 10, 1971, and now abandoned, which itself is a continuation-in-part of Application Ser. No. 86,767, filed Nov. 4, 1970 which is now U.S. Pat. 3,736,733.

Conventional forage harvesters are inherently defective in their failure to provide trouble-free operation under adverse conditions of downed crops; entangled masses of stalks, weeds and undergrowth; variances in stalk sizes; non-uniform or spotty growth; poor row alignment; heavy foliage and numerous or large ears on the stalks; uneven terrain; changing moisture conditions; and other factors. All of these differeing field and weather conditions directly affect, in one way or the other, the extent to which the harvester collects the entire crop and does so without the aggravating problems of machine clogging and jam-up, breakdown, and time loss. For the most part, the problems lie in the inability of the harvester to properly elevate all of the severed stalks and direct them into the rolls which, in turn, feed the stalks to the rotary chopper.

It is an important object of our present invention, therefore, to provide a harvester which by virtue of a novel and positive gripping action on the severed stalks, effectively transmits the same to the feed rolls without substantial loss of any of the crop, and equally important, without jamming and clogging of or damage to any of the harvester components.

Another important object of the instant invention is the provision of a harvester which effects proper crop elevation without the need for a multitude of vertically spaced elevator assemblies, as has heretofore been suggested in an attempt to solve the aforementioned problems, and without need for heavy, expensive, complicated and trouble-prone components of the kind commonly employed in conventional equipment of the kind to which the present invention relates.

Still another important object of our instant invention is the provision of a harvester which effectively releases the elevated stalks at the proper point and time for positive pick-up by the feed rolls, again without jamming or clogging, damage to parts or loss of any of the crop.

A further object of the present invention is to provide a harvester which effects a highly accurate orientation of the stalks at the moment of release by the elevators such that each stalk is directed to the feed rolls butt first and in a way to aid the rolls in the performance of their necessary functions of rapidly removing all the stalks from the elevators and feeding them uniformly to the rotary chopper in such manner as to fully and properly cut the stalks into fragments of desired sized. In the drawings:

FIG. 1 is a top plan view of a severed crop handling mechanism for harvesters made in accordance with our present invention;

FIG. 2 is an enlarged, fragmentary, cross-sectional view taken on line 2—2 of FIG. 1;

FIG. 3 is an enlarged, fragmentary, top plan view taken on line 3—3 of FIG. 2, parts being broken away for clearness;

FIG. 4 is a fragmentary top plan view, still further enlarged, of a portion of the intermediate elevator adjacent its inlet, parts being broken away and in section to reveal details of construction, severed stalks being shown in section;

FIG. 5 is a fragmentary cross-sectional view taken on irregular line 5—5 of FIG. 4, one of the severed stalks being shown in phantom;

FIG. 6 is a fragmentary cross-sectional view, still further enlarged, taken on line 6—6 of FIG. 4; and FIG. 7 is a detailed view, similar to a portion of FIG. 4, illustrating a modified lug.

FIG. 1 of the drawings broadly illustrates the three-row forage harvester described and claimed in our aforementioned co-pending application, wherein is provided a head attachment 10 having a pair of outer elevators 12 and 14 and an intermediate or median elevator 16, all discharging directly to a pair of longitudinally ribbed rolls 18 and 20 which operate conventionally to feed the severed stalks to a rotary chopper (not shown) of well-known characteristics disposed behind the rolls 18 and 20. However, it is to be understood that the principles of our present invention apply equally to head 10 having one or more elevators as well as to heads 10 which are not readily detachable.

Elevators 12, 14 and 16 decline forwardly from the rolls 18 and 20 (FIG. 2), and being substantially identical, reference is had to FIGS. 4-6 in connection with which only the elevator 16 will be described in more detail. It includes a pair of endless, stalk gathering members 22 from 24 which are also identical; hence, in describing member 22, it is to be understood that the same reference numerals are applied to the corresponding component parts of the member 24.

Member 22 is in the nature of a flexible chain having a series of identical lugs 26 which form links in the chain, pivotally connected with upper and lower links 28 that define alternate cavities 30 between the lugs 26. Each U-shaped lug 26 is a single unit which may be cast, molded, formed or stamped and bent from sheet stock of metal or other materials to present a pair of identical, vertically spaced, triangular, plate-like legs 32 and 34 having a bright element 36 integrally interconnecting the traiing edges of the legs 32 and 34.

Polygonal cavities 30 are shaped somewhat complementally to the legs or plates 32 and 34 and receive the apexes 38 of the corresponding opposed plates 32 and 34 with all of the leading edges 40 in spaced parallelism to the bight elements 36 of opposite lugs 26. The apexes 38 are spaced from the opposed links 28, such as to present a serpentine stalk-receiving space of uniform width throughout the lengths of the inner runs of chain members 22 and 24. Each lug 26 has a pair of rivets 42 through the plates 32 and 34 thereof which pass through spacers 44 and couple the lugs 26 with the links 28 to maintain the aforementioned parallelism while the severed stalks 46 are held clamped in the cavities 30 by the lugs 26.

A modified lug 26a has its plates (one being shown in FIG. 7 and designated 34a) interconnected by an intermediate element 36a disposed to present leading edges 40a and trailing edges 48, both of which engage the stalks 46.

Chains 22 and 24 operate between a pair of opposed sides 50 and 52 of an open top trough 54 whose inclined bottom is parallel to chains 22 and 24 and in the nature of a slide panel 56 for the several butts 46a of the stalks 46. Panel 56 has a terminal portion 58 at its upper end which extends beyond the point of release of the stalks 46 from the lugs 26 of chains 22 and 24 to a point closely juxtaposed to rolls 18 and 20, particularly roll 20. The inclination of panel 56 is steeper than that of portion 58, and upper edge 60 of the latter is considerably longer than the width of panel 56 such that portion 58 partially overlaps the lugs 26 of the inner runs of the inner chains 22a of elevators 12 and 14.

Elevators 12 and 14 are also provided with troughs 62 of identical nature, having parallel sides 64 and a slide panel 66, the latter of which is parallel to the chains 22a and 24a. Terminal portions 68 of panels 66 have steeper inclines than that of the panels 66, and as in the case of median terminal portion 58, they widen as roll 20 is approached. Moreover, the sides 66 at portion 68 flare outwardly to present an enlarged outlet for the stalks 46 emanating from the elevators 12 and 14.

Stripper plates 70 intersect the outermost of the two sides 64 above portions 68 in partial overlapping relation to the lugs 26 of the inner runs of the outer chains 24a of elevators 12 and 14. The innermost of the two sides 64 are joined with the sides 50 and 52 by arcuate walls 72 which extend between terminal portions 58 and the chains 22 and 24 of elevator 16, presenting an enlarged outlet for the stalks 46 emanating from elevator 16. Stripper plates 74 between chains 22 and 24 of of elevator 16 decline downwardly from the upper edges of walls 72.

OPERATION

During forward movement of the machine, stalks 46 are severed by cutter mechanism (not shown) at the lower, forwardmost ends of the elevators 12, 14 and 16, immediately after being grasped by the lugs 26 at the inner runs of all six chains 22 and 24. Thus, the stalks 46 are actually held by the lugs 26 during cutting which not only assists the cutting mechanism to produce a better cut, but holds the stalks 46 from falling away from the lugs 26 and being moved forwardly by the cutter mechanism. Lugs 26 do more than merely gather the stalks and convey the same toward the rolls 18 and 20; they actually support and elevate the stalks 46 because of the gripping action of the lugs 26 on the stalks 46 in the cavities 30. Moreover, such action is more than a mere jaw-like clamp upon the stalks 46 because of the fact that the edges 40 form transverse creases 76 in the stalks 46 (FIG. 6) as the elements 36 tend to form a diametrically opposed indentation 78 in the stalks 46. In the event lug 26a (FIG. 7) is used, edges 40a and 48 thereof will form two pairs of opposed creases 76.

This type of grip on the stalks 46 is highly important because it affords a firm positive holding action capable of preventing the stalks 46 from being pulled loose from the chains 22 and 24, particularly in a direction axially of the stalks 46 throughout the entire period of elevation. Once the stalks 46 enter the cavities 30 they cannot become dislodged regardless of the amount of entanglement or other conditions which normally present substantial difficulty in conventional harvesters. No clogging or jamming is likely to occur because all stalks 46 and all clamps of stalks 46 are quickly and completely carried away from the inlets of the elevators 12, 14 and 16 to clear such inlets for reception of additional stalks 46.

The action of lugs 26 is augmented by the presence of troughs 62, and especially the panels 56 and 66, because the butt ends 46a cannot sag unduly during elevation. Any tendency of the stalks 46 to descend by virtue of the flexibility of the chains 22 and 24 is limited as the severed ends 46a slide upwardly along the panels 56 and 66. But, of course, there is no tendency of stalks 46 slipping downwardly with respect to lugs 26 because of the interlock at creases 76, and to some extent at indentations 78, between stalks 46 and edges 40. Moreover, the double creasing action of lugs 26 at two vertically spaced zones of line contact by edges 40 with stalks 46 is even more effective than would be true if lugs 26 had but a single edge 40 wherein fore or aft tilting of the stalks 46 above the lugs 26 might tend to pull the stalks loose from the lugs 26.

In this connection also, creasing or indentation of the stalks 46 at the back and/or front thereof is preferred to primary creasing or indentation at the sides of stalks 46, because it is the fore and aft tilting of stalks 46 which usually causes much of the slippage of stalks from gathering mechanisms and consequent loss of part of the crop as well as jamming and clogging. Lateral tilting for at least the outer elevators may be prevented by stalk guides (not shown) spaced above the elevators 12, 14 and 16. However, as shown in FIG. 4, there is no point along the serpentine space between the chains 22 and 24 where stalks 46 are not effectively grasped. Stalks 46 at the bights of cavities 30 are also creased by the edges of the double links 28 and the edges of the apexes 38 of plates 32 and 34.

At the moment of release of the stalks 46 from lugs 26 they have progressed to a point where their butts 46a overlay the portions 58 and 68 of panels 56 and 66 respectively whereby such portions 58 and 60 effectively orient the stalks 46 so that they are pulled butt first by the rolls 18 and 20 from the elevators 12, 14 and 16. The tendency of the stalks 46 to lean forwardly is increased as the grip thereon by lugs 26 is released, causing the butt ends 46a to move along the terminal portions 58 and 68 to a point where they are engaged by the longitudinal ribs which are normally provided on rolls 18 and 20.

Having thus described the invention, what is claimed as new and desired to be secured by Letters Patent is:

1. In a row crop harvester:
 a pair of rolls adapted to feed severed stalks butt first to a stalk chopper behind the rolls;
 a plurality of stalk-moving elevators declined forwardly from said rolls for receiving the severed stalks and directing the same butt first to said rolls,
 each elevator including a single level only of side-by-side, endless, stalk-gathering members each having a series oftriangular, bifurcated gripping lugs spaced apart to presend an alternate series of stalk-receiving cavities with the apexes of the lugs of one member projecting into the cavities of the other member,
 each lug having a pair of superimposed, spaced-apart plates and being provided along one extremity with stalk-creasing means presented by the corresponding pair of spaced-apart edges of the plates,
 each lug being provided at its opposite extremity with backup means for cooperating with the stalk-creasing edges of an adjacent lug to firmly clamp a stalk between said edges and the backup means during operation of the members;
 means augmenting said holding action of the lugs including an inclined panel underlying each elevator respectively in parallelism therewith for slidably receiving said stalk butts while the stalks are held creased by the lugs and being elevated thereby, each pair of members having an upper, rearmost extremity wherein at least one member of the pair extends arcuately away from the other to define a point of stalk release; and means augmenting the action of the lugs of directing the stalks butt first to said rolls including a terminal portion on each panel respectively extending beyond said point of release of the stalks by the elevators to a point in close juxtaposition to said rolls, said terminal portions being disposed to orient the stalks for movement butt first between the rolls after the stalks are released from the elevators and prior to pickup of the stalks by the rolls.

2. In a row crop harvester as claimed in claim 1, wherein is provided a central elevator and a pair of other elevators on opposite sides of said central elevator, said panel of the central elevator being inclined more steeply than those of said other elevators.

3. In a row crop harvester as claimed in claim 2, wherein said terminal portions of the panels of said other elevators are inclined more steeply than their remaining portions.

4. In a row crop harvester as claimed in claim 3, wherein said terminal portion of the panel of said central elevator is inclined less steeply than the remaining portion of such panel.

* * * * *